Jan. 1, 1946. G. E. DATH 2,392,028
FRICTION SHOCK ABSORBER
Filed Feb. 17, 1944
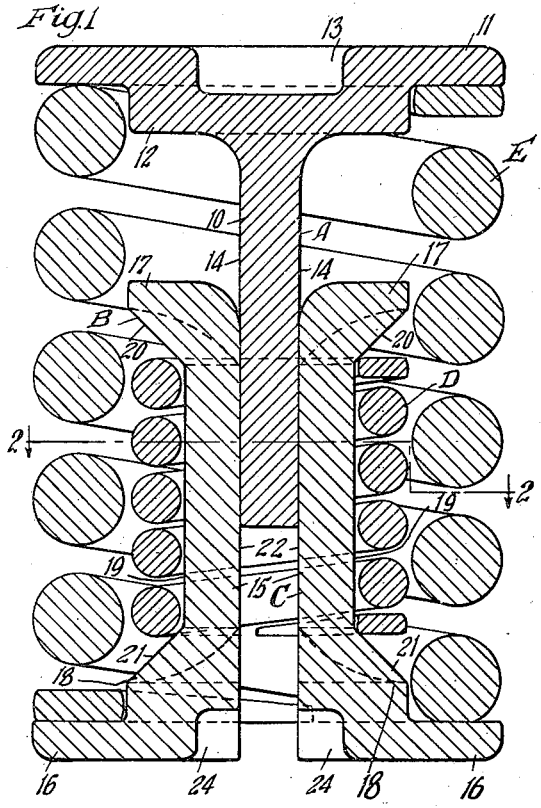
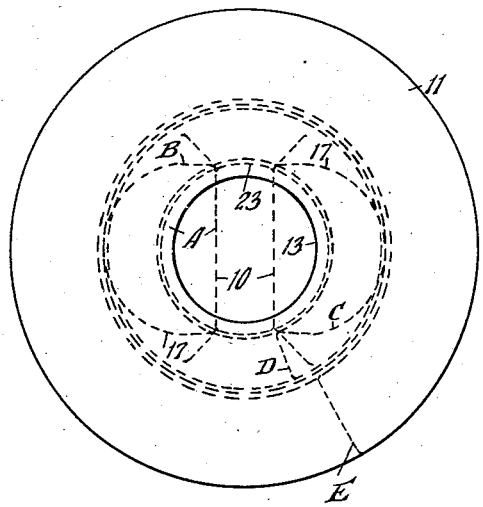
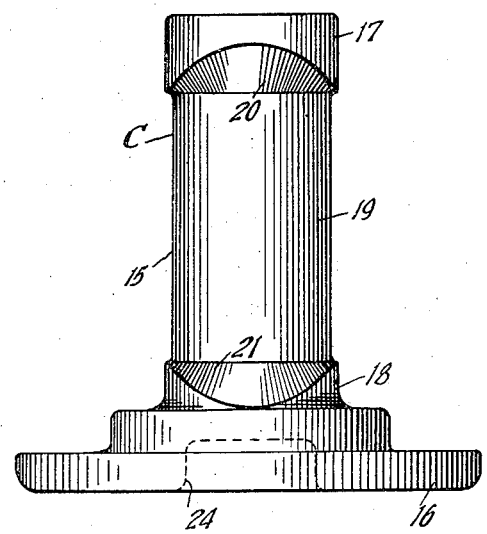
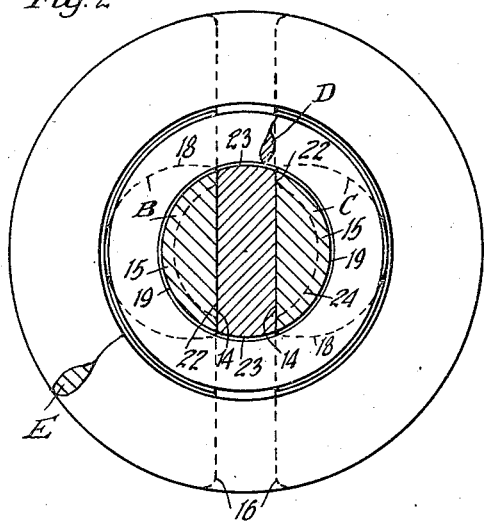
Inventor
George E. Dath
By Henry Fuchs
Atty.

Patented Jan. 1, 1946

2,392,028

UNITED STATES PATENT OFFICE 2,392,028

FRICTION SHOCK ABSORBER

George E. Dath, Chicago, Ill., assignor to W. H. Miner, Inc., Chicago, Ill., a corporation of Delaware Application February 17, 1944, Serial No. 522,692

17 Claims. (Cl. 267—9)

This invention relates to improvements in friction shock absorbers, especially adapted for use with truck springs of railway cars for dampening or snubbing the action of the springs.

One object of the invention is to provide a simple and efficient shock absorber adapted to replace one or more of the spring units of a truck spring cluster of a railway car for snubbing the action of said cluster.

Another object of the invention is to provide a shock absorber comprising cooperating, relatively slidable friction elements, wherein the friction elements are pressed together by spring means exerting pressure which is constant throughout the compression and expansion strokes of the mechanism, whereby the dampening or snubbing action is substantially uniform during operation of the device.

A further object of the invention is to provide a friction shock absorber of the character indicated, comprising relatively sliding friction elements, including a friction post and friction shoes embracing the post and slidable thereon, wherein the frictional contact is maintained by a spring member under initial compression, surrounding the shoes, and having direct engagement with wedge faces on the shoes to force the same against the post.

A more specific object of the invention is to provide a shock absorber, as set forth in the preceding paragraph, wherein the shoes are disposed at opposite sides of the post, together forming a contractible clutch, and are surrounded by a coil spring under initial compression, having the opposite ends thereof in direct wedging engagement with wedge faces at opposite ends of the shoes, to hold the clutch contracted and maintain uniformly constant frictional resistance between the shoes and the post.

Other objects of the invention will more clearly appear from the description and claims hereinafter following.

In the drawing forming a part of this specification, Figure 1 is a transverse vertical sectional view of my improved shock absorber. Figure 2 is a horizontal sectional view, corresponding substantially to the line 2—2 of Figure 1. Figure 3 is a top plan view of Figure 1. Figure 4 is an elevational view of one of the friction shoes of my improved shock absorber, the shoe at the right hand side of Figure 1 being illustrated, looking from right to left in said figure.

My improved friction shock absorber comprises broadly a friction post A; two friction shoes B and C; a spring D, under initial compression, surrounding the shoes and in wedging engagement therewith; and a heavy coil spring E surrounding the shoes and post and opposing relative lengthwise movement thereof.

The friction post A comprises a relatively wide platelike portion 10, which forms the post member proper, having a laterally projecting annular flange 11 at its upper end, which is in the form of a heavy disc having a downwardly offset, central portion or boss 12, which is formed with a central depression or recess 13, providing a seat adapted to receive the usual spring centering projection of the top spring follower plate for the truck spring cluster of the railway car. The plate 10 which forms the post proper depends from the disclike portion 11, as clearly shown in Figure 1, and presents flat, longitudinally extending friction surfaces 14—14 on opposite sides thereof.

The two friction shoes B and C are of identical design, each shoe comprising an upstanding heavy platelike member 15, which forms the friction shoe proper, having a laterally, outwardly projecting base flange 16 at its lower end. The platelike member 15 is laterally, outwardly enlarged at its upper and lower ends, as indicated at 17 and 18, the enlargement 18 at the lower end thereof merging with the base flange 16. The outer surface of the plate member 15 of each shoe is transversely rounded or curved, as indicated at 19, the curved surfaces 19—19 of the two shoes B and C being concentric and of the same radius. The enlargements 17 and 18 are provided with inner wedge faces 20 and 21, which are of conical contour, as clearly shown in Figure 4. On the inner side, each shoe presents a longitudinally extending, flat friction surface 22, which cooperates with the post A. The two shoes B and C embrace the post at opposite sides with the friction surfaces 22—22 thereof respectively engaging the friction surfaces 14—14 of the post. The friction surfaces of the post A and shoes B and C are of the same width and the opposite side edges of the post are rounded off or transversely curved, as indicated at 23, said curved surfaces 23—23 being concentric with and of the same radius as the curved outer surfaces 19—19 of the shoes, the curved surfaces 19—19 and 23—23 thus all lying in the same circle.

The spring D comprises a single coil surrounding the shoes and post and embracing the shoes. The spring D is interposed between the enlargements 17 and 18 of the shoes with its opposite ends bearing on the wedge faces 20 and 21 and is under a predetermined compression. The tendency of the spring to expand presses the end coils thereof against the wedge faces of the shoes, thus forcing the shoes laterally inwardly into tight frictional contact with the friction surfaces 14—14 of the post.

The amount of compression under which the spring D is placed is relatively great, being so proportioned as to size and capacity as to produce the desired amount of friction between the post and shoes. The shoes B and C, together with the spring D, form a contractible clutch, which frictionally grips the post A.

The spring E comprises a heavy coil surrounding the shoes B and C and the post A, bearing at its top and bottom ends respectively on the flange 11 of the post A and the flanges 16—16 of the shoes B and C. The spring E is preferably under initial compression.

My improved shock absorber is substituted for one or more of the spring units of a truck spring cluster, being interposed between the usual top and bottom spring follower plates of said cluster, the flange 11 of the post A bearing on the top spring follower plate, and the base flanges 16—16 of the shoes bearing on the bottom spring follower plate.

As shown in Figure 1, the base portions of the shoes are cut out or recessed, as indicated at 24—24, to provide a downwardly opening, central seat, adapted to accommodate the spring centering projection of the usual lower spring follower plate of the spring cluster.

In assembling my improved shock absorber, the spring D, held by a suitable clamp, is placed around the shoes in compressed condition, by inserting the shoes within the opening of the spring, upwardly through the lower end thereof, in succession. As will be evident, the opening of the spring provides sufficient clearance to permit passage therethrough of the enlarged upper end portion 17 of either shoe after the other shoe is in place. It is immaterial which shoe is first assembled with the spring D as long as they are applied successively. Assuming that the shoe B is first applied, the same is passed upwardly through the spring D until the enlargement 17 is disposed at a level above the spring. The shoe B is then displaced laterally to the position shown in Figure 1 with the enlargement overhanging the spring. The shoe C is next applied by entering the same through the lower end of the spring D, passing the same upwardly through the space provided between the inner side of the shoe B and the opposed inner side of the spring, which space is sufficient to permit free passage of the enlargement 17 of the shoe. After the shoe has been brought to a position wherein the enlargement 17 is above the upper end of the spring, the shoe is displaced laterally to bring the enlargement into overhanging relation with the spring and a temporary filler plate or shim is placed between the shoes to maintain the same spread apart and in wedging engagement with the spring D. The clamp is then removed from the spring D and the heavy coil spring E placed in position around the shoes B and C and seated on the flanges 16—16 thereof. The post A is next applied by forcing the plate portion 10 thereof between the shoes B and C, pushing out the temporary filler plate or shim. The shoes being beveled on their inner sides at the upper ends thereof, as shown in Figure 1, facilitate this operation. The mechanism is then compressed to a predetermined extent, thereby compressing the spring E between the flange 11 of the post A and the flanges 16—16 of the shoes. Due to the shoes B and C being held spread apart by the post A, the spring D has active wedging engagement with the wedge faces 20 and 21 of the shoes, thereby pressing the friction surfaces of the shoes tightly against the friction surfaces of the post. The clutching gripping action thus exerted on the post by the shoes B and C holds the mechanism assembled, the static friction between the post and shoes being sufficient to produce this result.

The operation of my improved shock absorber is as follows: Upon the cluster of springs of the railway car truck being compressed between the spring follower plates of the truck spring cluster, the friction post A and the friction shoes B and C are moved relatively toward each other in lengthwise direction, against the resistance of the spring E. Due to the wedging action between the spring D and the shoes, the required frictional resistance is produced between the post A and the shoes to snub the action of the truck springs. As will be evident, the frictional resistance to relative movement of the post A and shoes B and C remains constant throughout the compression of the mechanism, the pressure exerted by the spring D being substantially constant during this action.

Upon the spring follower plates of the truck springs being moved apart, during recoil of said springs, the expansive action of the spring E restores all of the parts to the normal release position shown in Figure 1. During recoil of the truck springs, the action of the same is also effectively snubbed or dampened by the frictional resistance between the post and the shoes, which is the same in expansion as in compression of the mechanism.

I have herein shown and described what I now consider the preferred manner of carrying out my invention, but the same is merely illustrative and I contemplate all changes and modifications that come within the scope of the claims appended hereto:

I claim:

1. In a friction shock absorber, the combination with a friction post; of friction shoes embracing said post, said shoes and post being slidable lengthwise with respect to each other; means pressing the shoes against the post, comprising wedge means at opposite ends of each shoe and a spring under predetermined compression interposed between and engaging the wedge means at opposite ends of said shoes; and spring means yieldingly opposing relative lengthwise movement of said post and shoes toward each other.

2. In a friction shock absorber, the combination with a friction post; of friction shoes embracing said post, said shoes and post being slidable lengthwise with respect to each other, each shoe having wedge faces at opposite ends thereof; a spring under predetermined compression embracing said shoes and interposed between and engaging said wedge faces at opposite ends of said shoes to wedge said shoes against the post; and spring means yieldingly opposing relative lengthwise movement of the shoes and post toward each other.

3. In a friction shock absorber, the combination with a friction post; of friction shoes embracing said post, said shoes and post being slidable lengthwise with respect to each other, each shoe having inwardly directed, exterior wedge faces at opposite ends thereof; a spring under predetermined compression embracing said shoes and interposed between and engaging said wedge faces at opposite ends of said shoes to wedge said shoes against the post; and spring means yieldingly opposing relative lengthwise movement of the shoes and post toward each other.

4. In a friction shock absorber, the combination with a friction post; of friction shoes embracing said post, said shoes and post being slidable lengthwise with respect to each other; means for wedging said shoes against the post including a coil spring under predetermined constant compression surrounding said shoes; and spring means yieldingly opposing relative lengthwise movement of the shoes and post toward each other.

5. In a friction shock absorber, the combination with a friction post; of friction shoes embracing said post, said shoes and post being slidable lengthwise with respect to each other; means for wedging said shoes against the post including exterior wedge means on said shoes and a coil spring under predetermined constant compression surrounding said shoes having wedging engagement with said wedge means; and spring means yieldingly opposing relative lengthwise movement of the shoes and post toward each other.

6. In a friction shock absorber, the combination with a friction post; of friction shoes embracing said post, said shoes and post being slidable lengthwise with respect to each other; means pressing the shoes against the post comprising wedge means at opposite ends of each shoe, and a coil spring under predetermined compression surrounding said shoes and interposed between and engaging the wedge means at opposite ends of said shoes; and spring means yieldingly opposing relative lengthwise movement of said post and shoes toward each other.

7. In a friction shock absorber, the combination with a friction post; of friction shoes embracing said post, said shoes and post being slidable lengthwise with respect to each other, each shoe having exterior, inwardly directed wedge faces at opposite ends thereof; a coil spring under predetermined compression surrounding said shoes and interposed between and engaging said wedge faces at opposite ends of said shoes to wedge said shoes against the post; and spring means yieldingly opposing relative lengthwise movement of the shoes and post toward each other.

8. In a friction shock absorber, the combination with a friction post having longitudinally extending friction surfaces on opposite sides thereof; of a pair of friction shoes embracing said post at opposite sides and having longitudinally extending friction surfaces engaging the friction surfaces of said post, said post and shoes being slidable lengthwise with respect to each other; means for pressing said shoes against the post comprising wedge means and a coil spring under predetermined constant compression surrounding said shoes and cooperating with said wedge means; and spring means yieldingly opposing relative lengthwise movement of the post and shoes toward each other.

9. In a friction shock absorber, the combination with a friction post having longitudinally extending friction surfaces on opposite sides thereof; of a pair of friction shoes embracing said post at opposite sides and having longitudinally extending friction surfaces engaging the friction surfaces of said post, said post and shoes being slidable lengthwise with respect to each other, each shoe having exterior, inwardly directed wedge faces at opposite ends thereof; a coil spring under predetermined compression surrounding said shoes and interposed between and engaging said wedge faces at opposite ends of said shoes to wedge said shoes against the post; and spring means yieldingly opposing relative lengthwise movement of the post and shoes toward each other.

10. In a friction shock absorber, the combination with a friction post having longitudinally extending friction surfaces on opposite sides thereof; of a pair of friction shoes embracing said post at opposite sides and having longitudinally extending friction surfaces engaging the friction surfaces of said post, said post and shoes being slidable lengthwise with respect to each other, each shoe having a laterally outwardly projecting enlargement at one end thereof provided with a wedge face, each shoe having a laterally outwardly projecting enlargement at the other end thereof; a coil spring under predetermined compression surrounding said shoes and interposed between said enlargements at opposite ends of said shoes and having wedging engagement with said wedge faces to wedge the shoes against the post; and spring means yieldingly opposing relative lengthwise movement of the post and shoes toward each other.

11. In a friction shock absorber, the combination with a friction element having longitudinally extending exterior friction surfaces; of friction shoes embracing said element in lengthwise sliding engagement with the friction surfaces thereof, each of said shoes having lateral wedge projections at opposite ends thereof; a coil spring surrounding said shoes and interposed between said wedge projections which are at opposite ends of the shoes and having its ends in wedging engagement therewith; and a spring yieldingly opposing relative lengthwise movement of said element and shoes toward each other.

12. In a friction shock absorber, the combination with an elongated friction element having longitudinally extending exterior friction surfaces; of friction shoe embracing said element in lengthwise sliding engagement with the friction surfaces thereof, each of said shoes having lateral wedge projections at opposite ends thereof; a coil spring surrounding said shoes and interposed between said wedge projections which are at opposite ends of the shoes and having its ends in wedging engagement therewith, said coil spring being under predetermined compression; and a spring yieldingly opposing relative lengthwise movement of said element and shoes toward each other.

13. In a friction shock absorber, the combination with a friction post having longitudinally extending friction surfaces at opposite sides thereof; of a pair of friction shoes embracing the inner end of the post at the friction surface sides thereof, said shoes having longitudinally extending friction surfaces on the inner sides slidably engaged with the friction surfaces of the post, said shoes having wedge projections at the inner and outer ends thereof; a coil spring surrounding said shoes, said spring being interposed between said inner and outer wedge projections of the shoes and held under predetermined compression between said projections; and a spring surrounding said post and shoes and opposing relative lengthwise movement thereof toward each other.

14. In a friction shock absorber, the combination with a friction post having longitudinally extending friction surfaces at opposite sides thereof, said post having a laterally outwardly extending follower flange at the outer end thereof; of a pair of friction shoes embracing the inner end of the post at the friction surface sides thereof, said shoes having longitudinally extending friction surfaces on the inner sides slidably engaged with the friction surfaces of the post, said shoes having wedge projections at the inner and outer ends thereof, each shoe having a laterally outwardly projecting follower flange at the outer end thereof; a coil spring surrounding said shoes, said spring being interposed between said inner and outer wedge projections of the shoes and held under predetermined compression between said projections; and a spring surrounding said post and shoes and bearing at opposite ends on the follower flange of the post and the follower flanges of said shoes opposing relative lengthwise movement thereof toward each other.

15. In a friction shock absorber, the combination with follower means at opposite ends of the mechanism, said follower means being movable toward and away from each other lengthwise of the mechanism; of an inwardly projecting post on the follower means at one end of the mechanism; a pair of friction shoes movable in unison with the follower means at the other end of the mechanism, said shoes embracing the inner end of the post at opposite sides thereof, each shoe having exterior wedge faces at opposite ends thereof; a coil spring under predetermined compression surrounding said shoes and bearing at opposite ends on the wedge faces at opposite ends of the shoes; and a heavy coil spring surrounding said post and shoes and bearing at opposite ends on the follower means at opposite ends of the mechanism.

16. In a friction shock absorber, the combination with a friction post; of friction shoes embracing said post and having lengthwise sliding movement thereon, said shoes having exterior, inwardly facing wedge faces at opposite ends thereof; and a coil spring under predetermined compression surrounding said shoes and interposed between the wedge projections at opposite ends of the shoes in wedging engagement with the wedge faces thereof.

17. In a friction shock absorber, the combination with a friction post; of a friction clutch cooperating with said post, said clutch including a pair of friction shoes enclosed within a surrounding coil spring, each of said shoes having exterior wedge faces at the inner and outer ends thereof, the wedge face at the inner end being on a lateral outward enlargement at the inner end of the shoe, said shoes being insertable within said coil spring through the outer end of said spring, the opening of said coil spring providing sufficient clearance for the enlarged end of either of said shoes to pass through said opening when the other shoe is positioned within said coil spring, said post being engaged between said shoes and holding the same laterally spread apart with the enlargements thereof overhanging the coil spring and the wedge faces thereof in engagement with the opposite ends of said coil spring to maintain the same under predetermined compression, said post and shoes being relatively slidable lengthwise and the resiliency of said compressed spring wedging the shoes into tight frictional engagement with the post.

GEORGE E. DATH.